J. T. CASE, DEC'D.
R. G. BALDWIN, ADMINISTRATOR.
ROTARY ENGINE.
APPLICATION FILED APR. 24, 1916.
1,250,430.
Patented Dec. 18, 1917.
5 SHEETS—SHEET 1.
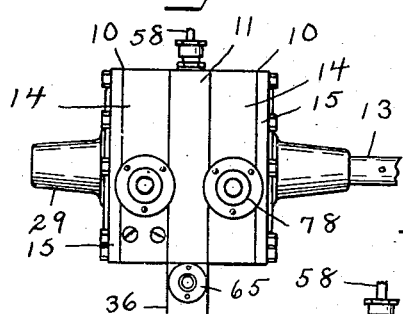
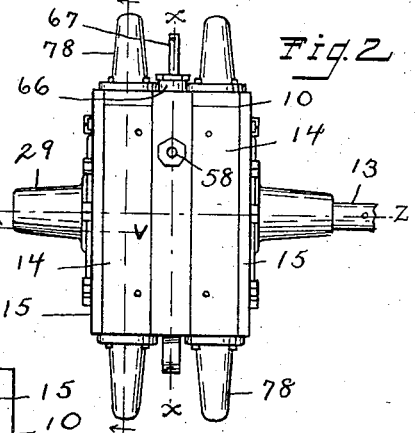
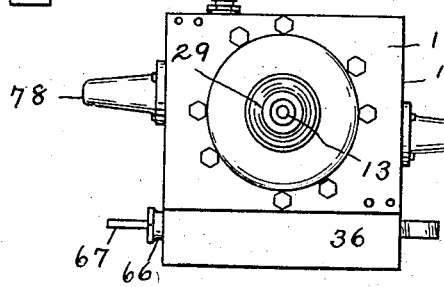
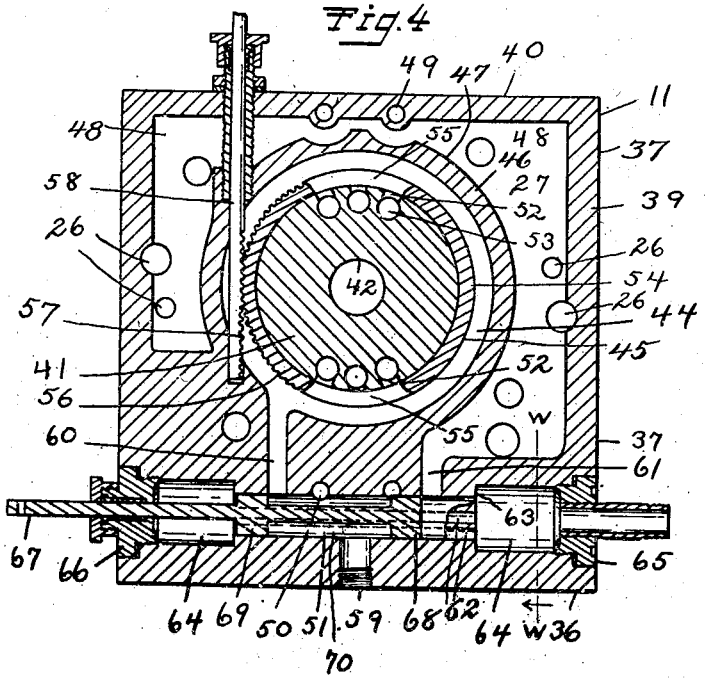
Inventor:
Joel Tiffany Case.
By Louis M. Schmidt.
Atty.

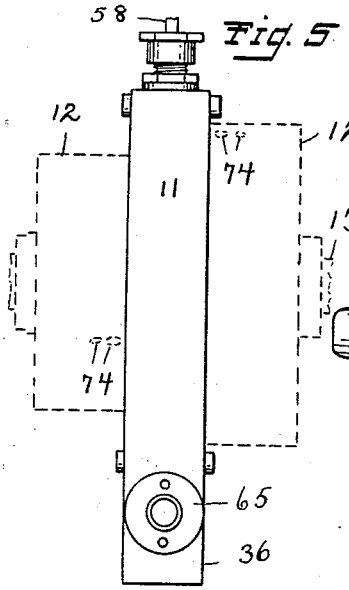
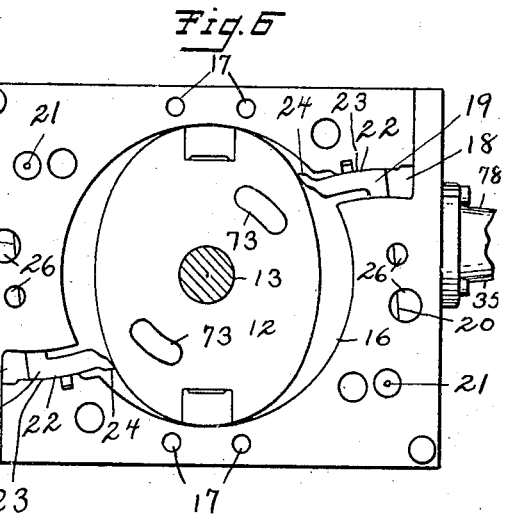
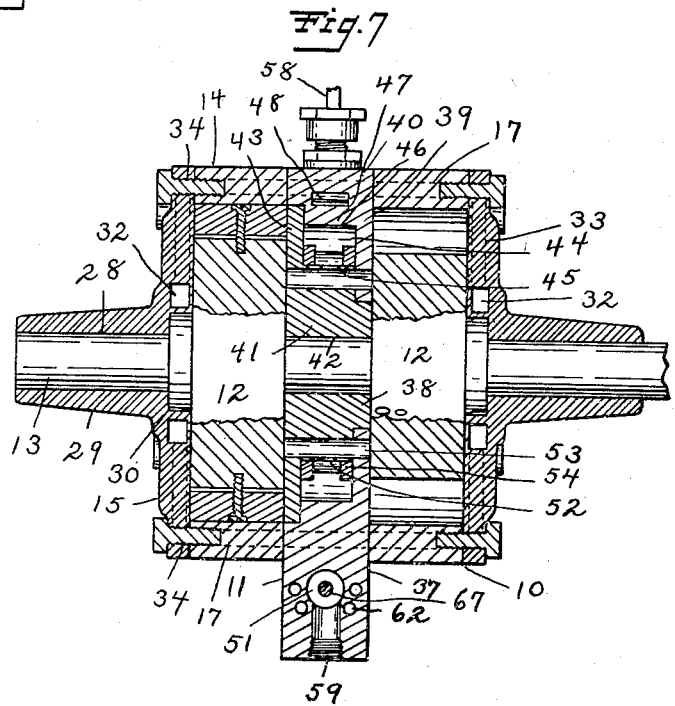

J. T. CASE, DEC'D.
R. G. BALDWIN, ADMINISTRATOR.
ROTARY ENGINE.
APPLICATION FILED APR. 24, 1916.
1,250,430.
Patented Dec. 18, 1917.
5 SHEETS—SHEET 3.
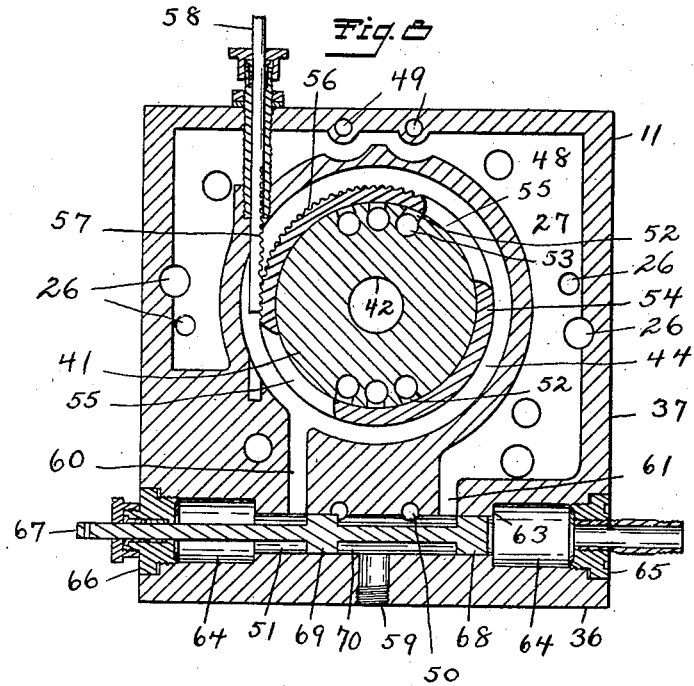
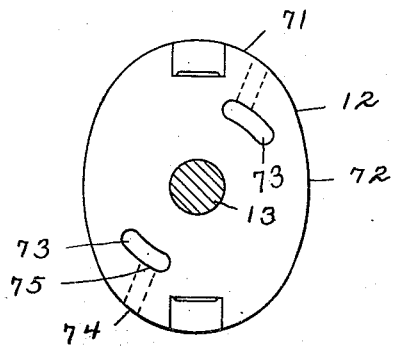
Inventor:
Joel Tiffany Case.
By Louis M. Schmidt
Atty.

J. T. CASE, DEC'D.
R. G. BALDWIN, ADMINISTRATOR.
ROTARY ENGINE.
APPLICATION FILED APR. 24, 1916.

1,250,430.

Patented Dec. 18, 1917.
5 SHEETS—SHEET 4.

Inventor:
Joel Tiffany Case.
By Louis M. Schmidt
Atty.

J. T. CASE, DEC'D.
R. G. BALDWIN, ADMINISTRATOR.
ROTARY ENGINE.
APPLICATION FILED APR. 24, 1916.

1,250,430.

Patented Dec. 18, 1917.
5 SHEETS—SHEET 5.

Inventor:
Joel Tiffany Case
By Louis M. Schmidt
Atty.

UNITED STATES PATENT OFFICE.

JOEL TIFFANY CASE, OF BRISTOL, CONNECTICUT; R. GORDON BALDWIN ADMINISTRATOR OF SAID JOEL T. CASE, DECEASED.

ROTARY ENGINE.

1,250,430.

Specification of Letters Patent. Patented Dec. 18, 1917.

Application filed April 24, 1916. Serial No. 93,158.

*To all whom it may concern:*

Be it known that I, JOEL TIFFANY CASE, a citizen of the United States, residing at Bristol, in the county of Hartford and State of Connecticut, have invented certain new and useful Improvements in Rotary Engines, of which the following is a specification.

My invention relates to improvements in rotary engines, and the object of my improvement is simplicity and economy in construction and convenience and efficiency in use, and the same involves in part certain features of construction and operation shown and described in my Patent No. 612,191, Oct. 11, 1898.

In the accompanying drawing:—

Figure 1 is a side elevation of my improved rotary engine.

Fig. 2 is a plan view of the same.

Fig. 3 is an end elevation of the same.

Fig. 4 is a sectional view, on an enlarged scale, on the line $x$ $x$ of Fig. 2.

Fig. 5 is an end elevation of the steam chest member, the position of the pistons being indicated by broken lines.

Fig. 6 is an elevation of the cylinder member, as viewed from the inner side, and the piston positioned therein.

Fig. 7 is a sectional view on the line $z$ $z$ of Fig. 2.

Fig. 8 is a sectional view corresponding to Fig. 4, with the parts in different positions.

Fig. 9 is an end elevation of the piston member.

Figure 10:
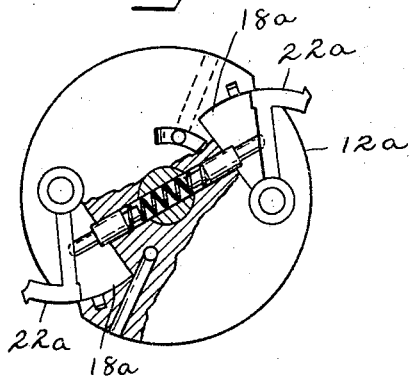
Fig. 10 is a similar view of a modification of the piston member.

My improved rotary engine comprises a three part casing composed of a cylinder member 10 at each end and a steam chest member 11 interposed between the same, and a piston 12 housed in each of the cylinder members 10, the two pistons 12 being mounted on a common shaft 13 and disposed angularly at ninety degrees the one from the other.

The cylinder member 10 is built of two parts, comprising the inner part 14 and the outer part 15. The inner part 14 is a generally flat structure, having parallel end faces and a length from face to face corresponding to the desired thickness of the piston 12, having a circular bore 16 that serves as the cylinder proper, the exterior cross-section being rectangular and approximately square, and also having at the top and bottom a plurality of perforations 17 extending entirely through the structure, that serves as connecting passages for the steam jacketing.

At diametrically opposite portions of the cylinder 16 there are recesses 18 of peculiar form for housing the abutments 19, and corresponding in detail to the structure shown and described in the patent referred to above. Thus the abutments 19 comprise an arm 20, pivotally mounted by one end on the pivotal pin 21, and supporting by the other end the abutment proper 22, the latter extending generally inwardly from the supporting arm 20, suitably to be projected into the cylinder space 16. The abutment proper 22 has a curved outer face 23 for the greater part of its length and at the inner end is provided with an outwardly extending toe 24 which serves to provide a steam pressure surface for holding the abutment in engagement with the periphery of the piston 12.

The recess 18 on the side remote from the pivotal pin 21 is a good fit for the opposed face of the abutment 22, composed of the curved surface 23 and the toe 24. On the side of the abutment 22 toward the pivotal pin 21 the recess 18 is relatively open and is connected through suitable passages 26 in the end walls of the steam chest member 11 with the exhaust chamber 27.

The inner part 14 of the cylinder member 10 is closed on the inner face by the steam chest member 11 and on the outer face by the outer part 15.

The said outer part 15 fits against the opposed face of the inner part 14, has an axial bore 28 that fits the shaft 13 and serves as a bearing therefor, and which bore may be extended outwardly through a boss 29 and has at the inner end an annular enlargement 30 for housing a hub extension on the piston 12. The body wall of the outer part 15 is of proper thickness to provide for steam jacketing, having an annular chamber 32 extending around the bore 28 and a plurality of passages 33 extending upwardly and downwardly therefrom with branch passages 34 at the outer ends. The said branch passages 34 extend parallel with the axis of the shaft 13 and register with the perforations 17 in the inner part 14.

Referring once more to the inner parts 14, these are provided with spring devices 35 that operate against the arms 20 of the abutments 22 and tend to push the same inwardly into the cylinder space, the said devices being partially housed in cap extensions 78 that are mounted on the lateral wall of the inner part 14.

The steam chest member 11 consists of the upper body portion that fits against the opposed inner faces of the cylinder members 10 and a lower extension 36 in which are housed steam control devices to be described, and is built up of two main parts. The said parts comprise the frame member 37 and the closing member 38. The frame member 37 comprises in one piece the lower extension 36 at the lower end, a wall 39 extending upwardly from one side thereof and serving as one of the end walls of the body portion, and at the upper end the top wall 40. The closing member 38 comprises a hub portion 41 that extends axially through the steam chest structure and has an axial bore 42 that fits the shaft 13, and at one end of the said hub portion 41 has a flange-like structure 43 that fits within the frame member, suitably to complete the second end wall.

The interior structure of the steam chest member comprises the following features:—
An annular space 44 is provided between the cylindrical periphery 45 of the hub portion 41, which serves as the inner wall, and the opposed cylindrical wall 46 of a division wall 47, the latter being structurally a part of the frame member 37, the said space 44 being usually supplied with live steam and serving as the steam chest.

The space 48 between the division wall 47 and the exterior wall is cored out and serves normally as the exhaust chamber.

At the top there are cross-passages 49 that register with the passages 17 and coöperate therewith in effecting the steam jacketing and at the lower end are passages 50 that coöperate similarly with the lower passages 17 and which also open into the steam cylinder 51 of the steam control devices.

The exhaust ports 26 in the end walls of the steam chest member 11 already mentioned open into the exhaust chamber 48.

The live steam ports consist of two sets of passageways for each cylinder, comprising a plurality of radial perforations 52 in the hub portion 41 extending inwardly from the cylindrical periphery 45 and connecting with cross-passages 53 that extend through the steam chest structure 11 from end to end.

A governor-controlled cut-off ring 54 fits over the cylindrical periphery 45 of the hub portion 41 and is rotatively mounted thereon. The said ring 54 is provided with a plurality of radial passages 55 that are adapted to register with the radial passages 52, and is further provided at a portion of the periphery with a set of teeth that serve as a sector in coöperation with a rack 57 on the governor rod 58 for rotating the ring 54.

As shown there are three cross-passages 53, and these are so close together that they operate virtually as a single extended passage. Similarly the radial passages 52 and 55 are sufficient in number in each group to serve as extended passages.

The steam control devices comprise a cylinder 51, already mentioned, provided in the lower extension 36 of the steam chest member 11, connected as shown at the lower side and at the middle thereof with the inlet port 59, and connected on the upper side with the steam chest proper 44 by a port 60 adjacent one end of the said cylinder 51 and connected adjacent the other end thereof with the exhaust chamber 48 by the passage or port 61. The cylinder 51 extends appreciably beyond the ports 60 and 61 on each side and the two end portions are cross-connected by longitudinal passages 62. As shown there is a plurality of the longitudinal passages 62, and these are straight passages, terminating in the end walls 63 of enlargements 64 of the cylinder 51.

The enlargement 64 at one end is closed by a fitting 65 suitable to connect with the exhaust pipe and the enlargement at the other end is closed by a stuffing-box structure 66, suitable for operatively receiving the valve stem 67.

Connected to the valve stem 67 is a piston valve of duplex construction, comprising a head 68 at the extreme inner end that fits the cylinder 51 and a second, generally similar head 69 separated therefrom longitudinally by the space 70.

The spacing of the heads 68 and 69 is such that when the valve is in the central position one of the said heads covers the port 61 from the exhaust chamber 48 and the other covers the port 60 leading to the steam chest 44, so that when the valve is moved toward one end or the other of the cylinder 51 so as to uncover the said ports 61 and 60 one of the said ports will be connected to the space 70 between the heads 68 and 69 and through the same to the live steam supply inlet 59 and the other will be connected to one of the ends of the cylinder 51, and thence to the exhaust, either directly or through the longitudinal passages 62.

Under normal conditions of operation the central space 70 will be connected to the port 60 so as to deliver live steam to the steam chest 44 and the port 61 will be connected to the exhaust.

Figure 11:
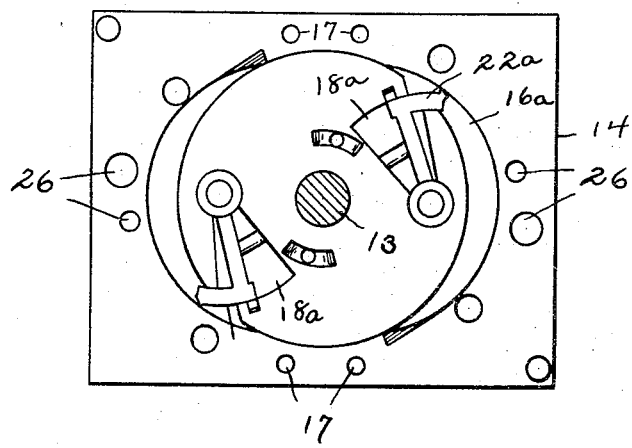
Fig. 11 is an end elevation, corresponding to Fig. 5, of the cylinder used with the piston member shown in Fig. 10.
Figure 12:
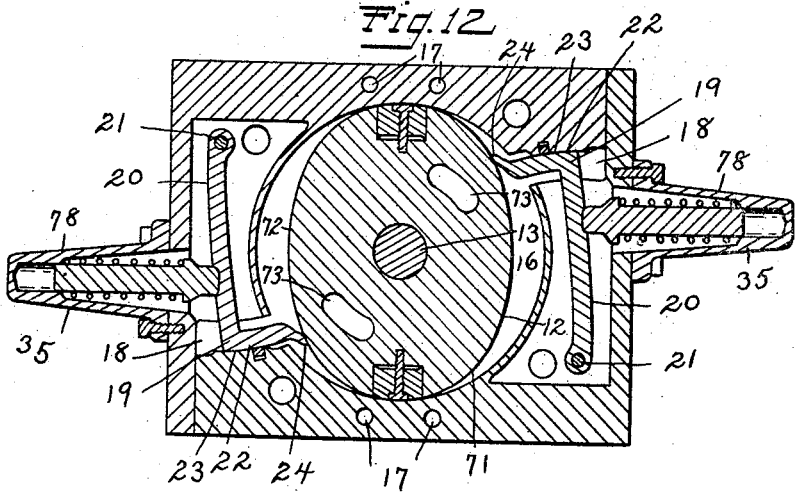
Fig. 12 is a sectional view on the line $u$ $u$ of Fig. 2 and on the same scale as Fig. 4.
Figure 13:
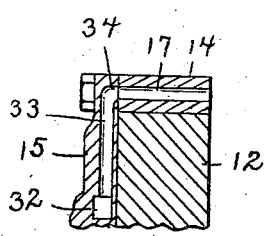
Fig. 13 is a fragmentary sectional view on the line $v$ $v$ of the said Fig. 2.
Figure 14:
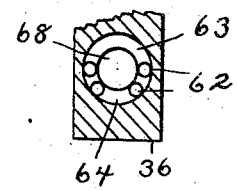
Fig. 14 is a fragmentary sectional view on the line $w$ $w$ of Fig. 4.

The piston 12 is generally oval in shape. In detail the periphery thereof comprises a cylindrical portion 71 at each end extending over an appreciable arc and fitting the wall of the cylinder 16 and relatively flattened portions 72 at the sides and separated from the walls of the cylinder 16 by a crescent shaped space on each side to which space steam is admitted for operating the piston.
The means for admitting steam to the cylinder 16 comprise a port at each end portion of the piston 12, the said port comprising an inlet opening 73 in the side wall that registers with the cross perforations or passages 53 leading from the steam chest 44, an outlet 74 in the peripheral wall of the piston 12, adjacent the junction of the cylindrical portion 71 and the flattened portion 72, and a connecting passage 75 of any suitable form. The inlet 73 is preferably elongated in the direction of revolution and the outlet 74 may be composed of a plurality of adjacent openings, each of which is connected to the inlet 73.
In the modification shown in Figs. 10 and 11 the piston 12ª is round and the cylinder 16ª has the oval shape, and the abutments 22ª are housed in recesses 18ª in the piston 12ª, after the manner of one of the styles shown and described in the patent referred to.

In both styles of operation it will be noted that a single piston valve serves to give complete control of the steam supply, whereby the steam is either shut off or is supplied for operation in either direction. The live steam ports for normal operation, with the ports in the piston body connected to the steam chest for live steam supply are positioned to permit steam to enter just as the cylindrical portion of the piston passes the abutment. Then as steam enters and the piston turns the ports pass out of registration and the steam operates expansively until the outer end of the piston uncovers the side passage or recess back of the abutment, and the same is connected to the steam space of the cylinder, whereby the said steam space is connected to the exhaust.
The live steam ports mentioned are of liberal dimensions, so that the actual control of the steam supply is determined by the governor ring, responsive to the action of the governor, the latter being of any suitable type. As the governor ring is shifted more or less of the unperforated portion is positioned over the radial ports 52 and thus serve to regulate the steam supply.

As shown the steam jacketing consists of two endless passages extending in parallelism around the entire body structure and opening into the valve chamber 51, suitably to be supplied with live steam. Furthermore, as the valve chamber 51 and the live steam inlet are at the bottom there will be ample drainage for condensation in the steam jacketing.

The fact that the two pistons are positioned in ninety degree relation insures that one or the other is always off the center and is in position for operation so that the engine will always be ready to start.

The feature of having the steam chest interposed between two pistons as described insures a balancing of the pistons, so that the piston structure is always in condition to run freely, without binding or undue pinching.

Fig. 4 shows the parts in position for normal operation, the space 44 that serves as the steam chest being connected with the live steam supply and the space 48 that serves as the exhaust chamber being connected with the exhaust.

Fig. 8 shows the parts in position for reverse or abnormal operation, the exhaust chamber 48 being connected with the live steam supply and the steam chest 44 being connected with the exhaust, the last named connection being made by way of the longitudinal passages 62. As shown, the port 60 from the steam chest 44 connects with the valve chamber 51 and the head 69 of the piston valve is interposed between the said port and the steam supply connection 59, the latter being at the middle of the steam chest structure. Thus the exhaust extends or flows outwardly from the port 60 through the valve chamber 51 into the valve chamber enlargement 64 that houses the valve stem 67, and thence flows longitudinally through the passages 62 to the second enlarged space 64, the latter being open to the exhaust.

By providing the enlargements 64 at the ends of the valve chamber proper 51 the passages 62 that connect the said enlargements are made straight, as shown, and the same can be provided in plurality, also as shown.

Thus a specific description of the course of the steam in entering the cylinders and exhausting therefrom while the engine is operating in its reverse or "abnormal" direction, with the reversing valve in the position shown in Fig. 8 is as follows:—

The steam enters by way of the steam supply connection 59 to the portion of the valve chamber 51 between the valve heads 68 and 69, and travels thence through port 61 to the exhaust chamber 48, thence through the end wall passages 26 in the two lateral walls of the steam chest member 11 to the recesses 18 in which the abutments 19 are housed, and is admitted from the recesses 18 to the cylinders 16 to one side of the abutment proper 22, and acts on the pistons 12. From the cylinders 16 the steam is periodically admitted by way of the connecting passages 75 in the pistons 12 to the cross perforations 53 in the hub portion 41, and thence through the radial perforations 52 in the said hub portion 41, and through the radial passages or openings 55 in the cut-off ring 54 to the live steam chamber 44 and thence through the port 60 and the left end portion of the valve chamber 51 as shown in Fig. 8, to the valve chamber enlargement 64 at the left side, thence through the longitudinal passages 62 to the enlargement 64 at the right side, and finally to the exhaust passage provided in the fitting 65.

As described, provision is made for operating my engine in either direction, and the control for the direction of operation is effected by suitably adjusting the piston valve.

I claim as my invention:—

1. A rotary engine comprising a pair of cylinder members each having a cylinder, a steam chest interposed between the said cylinder members, pistons housed in each of the said cylinders and mounted on a common shaft, the said steam chest member having a steam chest and an exhaust chamber, the end walls of the said steam chest member having ports that connect the said steam chest and exhaust chamber with the said cylinders, and a valve chamber on one side of the said steam chest member having ports connecting with the said steam chest and exhaust chamber and also having an inlet and an exhaust port and a valve for interconnecting the said ports.

2. A rotary engine comprising a structure having a cylinder at each end, a steam chest member in the middle, and an extension at the lower end of the said steam chest member having a valve chamber, the said structure having a passage extending through the wall portion at the top, sides and bottom, and opening into the said valve chamber.

3. A rotary engine comprising a structure having a cylinder at each end, a steam chest member in the middle, an extension at the lower end of the said steam chest member having a valve chamber, the said steam chest member having a steam chest connected to the said valve chamber and an exhaust chamber also connected to the said valve chamber, and the said structure having a steam-jacket passage that is connected to the said valve chamber.

4. A rotary engine comprising a steam chest member and a cylinder adjacent thereto, the said steam chest member having an annular steam chest, and ports leading from the said steam chest to the said cylinder having openings in the inner wall of the said steam chest, and a governor ring rotatively mounted on the said inner wall, having a limited rotative movement and having perforations suitable for being brought into registration with the said openings.

5. A rotary engine comprising a steam chest member and a cylinder adjacent thereto, the said steam chest member having an annular steam chest, and ports leading from the said steam chest to the said cylinder having openings in the inner wall of the said steam chest, a governor ring rotatively mounted on the said inner wall, having a limited rotative movement and having perforations suitable for being brought into registration with the said opening, and means engaged with the periphery of the said ring for rotating the same.

6. In a rotary engine comprising in combination a pair of cylinders, a steam chest member, a piston structure operatively housed in each of the said cylinders, a common shaft for the said piston structures, the said piston structures having a relative angular displacement on the said shaft of 90 degrees, and each comprising a pair of similar diametrically opposed eccentric portions that serve as pistons proper, and the said steam chest member being interposed between the said cylinders, having end walls in abutment with the said piston structures, having a steam chest and an exhaust chamber, and also having ports in the said end walls connecting the said cylinders with the said steam chest and exhaust chamber, whereby means are provided for effecting both balanced rotative movement relatively to the said shaft and balanced end thrust relatively to the said piston structures and the end walls of the said cylinders.

JOEL TIFFANY CASE.

Witnesses:
R. W. EDWARDS,
E. E. HARDY.

Copies of this patent may be obtained for five cents each, by addressing the "Commissioner of Patents. Washington, D. C."